United States Patent
Sciammarella et al.

(10) Patent No.: US 6,384,869 B1
(45) Date of Patent: May 7, 2002

(54) CHANNEL SCAN FUNCTION AND METHOD OF DISPLAYING SCANNED CHANNELS

(75) Inventors: Eduardo A. Sciammarella; Franklin Servan-Schreiber, both of New York, NY (US)

(73) Assignees: Sony Corporation (JP); Sony Corporation of America, New York, NY (US)

( * ) Notice: Subject to any disclaimer, the term of this patent is extended or adjusted under 35 U.S.C. 154(b) by 0 days.

(21) Appl. No.: 09/183,525

(22) Filed: Oct. 30, 1998

(51) Int. Cl.[7] .............................................. H04N 5/445
(52) U.S. Cl. ....................... 348/564; 348/569; 348/570; 348/906; 345/342; 345/343
(58) Field of Search .................................. 348/564, 565, 348/569, 570, 906, 732; 345/437, 473, 126, 977

(56) References Cited

U.S. PATENT DOCUMENTS

| | | | | |
|---|---|---|---|---|
| 3,716,842 A | * | 2/1973 | Belady et al. ............... | 345/341 |
| 5,973,691 A | * | 10/1999 | Servan-Schreiber ......... | 345/342 |
| 6,075,575 A | * | 6/2000 | Schein ......................... | 348/734 |
| 6,091,457 A | * | 7/2000 | Brill ............................ | 348/553 |
| 6,094,237 A | * | 7/2000 | Hashimoto ................... | 348/731 |
| 6,111,614 A | * | 8/2000 | Mugura et al. ............. | 348/569 |

* cited by examiner

Primary Examiner—Michael Lee
Assistant Examiner—Trang U. Tran
(74) Attorney, Agent, or Firm—Lerner, David, Littenberg, Krumholz & Mentlik, LLP

(57) ABSTRACT

A method and structure is capable of scanning through available programs on a display screen and selectively displaying the most recently scanned programs in a spiral formation on the display screen. The spiral formation conveys visual information to the viewer about when the programs were scanned by the arrangement and sizing of a number of positions of the spiral formation. Provided with the visual information of the recently scanned programs in the spiral formation, the viewer can readily determine which programs were recently scanned and when they were scanned.

15 Claims, 16 Drawing Sheets

CHANNEL SCAN FUNCTION AND METHOD OF DISPLAYING SCANNED CHANNELS

CROSS REFERENCE TO RELATED APPLICATIONS

The subject matter of the present application is related to copending U.S. application Ser. No. 09/183,008 and copending U.S. application Ser. No. 09/183,010, both filed contemporaneously with this application, assigned to Sony Corporation and to SonyElectronics, which are hereby expressly incorporated herein by reference.

FIELD OF THE INVENTION

This invention relates generally to a method for scanning channels and displaying information relative to the scanned channels on visual display screens, and more particularly to a method for displaying chronological scanned channel information on display screens wherein intuitive and user friendly visual techniques express the relative chronological position of each scanned channel. The invention is particularly applicable in television programming and related visual information display in the fields of terrestrial, cable, satellite and other distribution of video programming, and in the visual display of computer information such as internet, files, programs, and documents.

BACKGROUND OF THE INVENTION

Various methods of displaying visual information on display screens, such as those utilized in computer and television, are well known in the art. Since the intent of a visual display is to convey information to the viewer of the display, various prior art formats have evolved which are considered efficient when used for the display of particular types of visual information. For example, movies on television are generally presented using a full screen format, whereas temperature data for cities around the country are usually presented in a list format. Hybrid examples are also common, such as the full screen presentation of a sports event with the score and other numeric data of interest occupying a small area of the screen. Computer program data is commonly presented in a list, table, or matrix format and handheld remote controls and many computer programs utilize interactive menus and dropdown lists in combination with icon symbols to achieve the desired user interactivity.

Similar display formats are also utilized when the results of video scanning operations are presented on visual display screens. For example, when television channels are scanned the usual visual presentation is a full screen full motion picture of the, channel currently tuned in. This method does not provide video information about previously scanned channels on the display, and thus the viewer must remember which channels he has gone through and their relative location chronologically with. respect to the currently displayed channel.

The scanning of computer documents, files and programs is often accomplished in a similar manner and the item displayed currently is a full screen presentation. Once again the viewer must remember the chronological distance back to some desired (and passed) item.

One prior art approach to overcome this problem has been to divide the screen into equal divisions in the vertical or horizontal directions, or in both directions simultaneously, so as to allow some chronological information to be displayed. This represents an improvement in the sense that more events can be simultaneously displayed, but it does not provide an intuitive sense of what is recent and what is old. This approach also suffers from the fact that the larger the number of subdivisions the harder it is for the viewer to see current and recent images.

While prior art methods do allow for scanning of television channels and other information content, a visual presentation of past scanned items is often not provided concurrent with the most recently scanned item. As pointed out above, the viewer must deal with this deficiency. The viewer is required to remember a past channel number, or several channel numbers, that were thought to be possible viewing choices when seen but were not selected at that time. So either the viewer must remember past channels of potential interest, or start scanning backwards in an attempt to relocate them. Backwards relocation scanning can be unrewarding, since the visual content of the sought channel will in all likelihood have changed since it was last seen. This adds an element of viewer frustration. Additionally, viewers typically have more trouble remembering as they grow older, and older viewers may already be somewhat uncomfortable with the latest high tech "gadgets." These things can add up to extensive discomfort for the older viewer when channel surfing.

It has been pointed out above that one prior art approach to the problem of displaying a history of scanned channels, past and present, is to partition the display screen into numerous boxes. One disadvantage of this approach is that the current channel is reduced in size, which is a problem for viewers who do not see well or who do not like the concentration required to observe small images. Once again this problem may be disproportionately found in the older age groups who have a higher percentage of eye problems.

In light of the above discussions it is clear that there exists a need in the art to be able to provide improved visual presentation of the results of scanned items such as television channels, internet sites, computer documents, files, and programs. In particular, there is a need to display scanning results in a manner such that chronological information is retained for each scanned item, while allowing the current item to be easily viewed.

SUMMARY OF THE INVENTION

It is accordingly an object of the invention to be able to provide improved visual information to a viewer of an AV system concerning recently scanned or viewed channels and programs.

According to the present invention, a method and structure visually provides information concerning programs or channels recently viewed on a display screen of an audio/visual (AV) system. The viewer uses a remote control device to invoke a scan mode in which a plurality of available channels of information are sequentially displayed to the viewer on the display screen. A current program and information about the current program, such as type of program, title, station, duration, etc., is then displayed on the display screen. If the viewer does not select the current program within a predetermined period of time, the current program fades out into a spiral formation at the same time that views being displayed in a plurality of positions of the spiral are rotated to free-up the position reserved for the most recently viewed program. The current program is then displayed in the most recently viewed position of the spiral. If, however, the viewer does select the current program, the scan mode is aborted, causing the spiral formation to fade out and be replaced by the selected program being displayed on the display screen in real-time and full-size.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention is a method and structure for scanning through available programs on a display screen, such as a television monitor, and selectively displaying the programs most recently scanned in a spiral formation on the display screen that presents to the viewer visual information about the most recently to the least recently scanned programs. Presented with the visual information of the recently scanned programs in the spiral formation, the viewer can readily determine which programs were recently scanned and when they were scanned without having to remember this information. This is because the spiral formation conveys visual information to the viewer as a function of the size and location of scanned images within the spiral. The viewer can also select one of the programs in the spiral formation and choose to watch that program. In an audio/visual (AV) system, such as a Direct Satellite System (DSS), the viewer will typically employ a remote control device to scan through available channels and select a program of the spiral formation to view. Such an AV system will be described below in conjunction with FIGS. 23 to 25.

The present invention, however, is not limited to AV systems and may be used when scanning television channels and other similar information on television and computer displays in applications employing terrestrial, cable, satellite and other means of distributing video programming. The present invention allows for either automatic or manual scanning from one channel to the next, and as it scans an image of the scanned program is graphed and placed in the spiral formation according to when it was scanned. The current or newest scanned image will be displayed as a moving image in the spiral, and preceding images are displayed as still images, although they could be moving images if multiple channel tuners are utilized.

Figure 1:
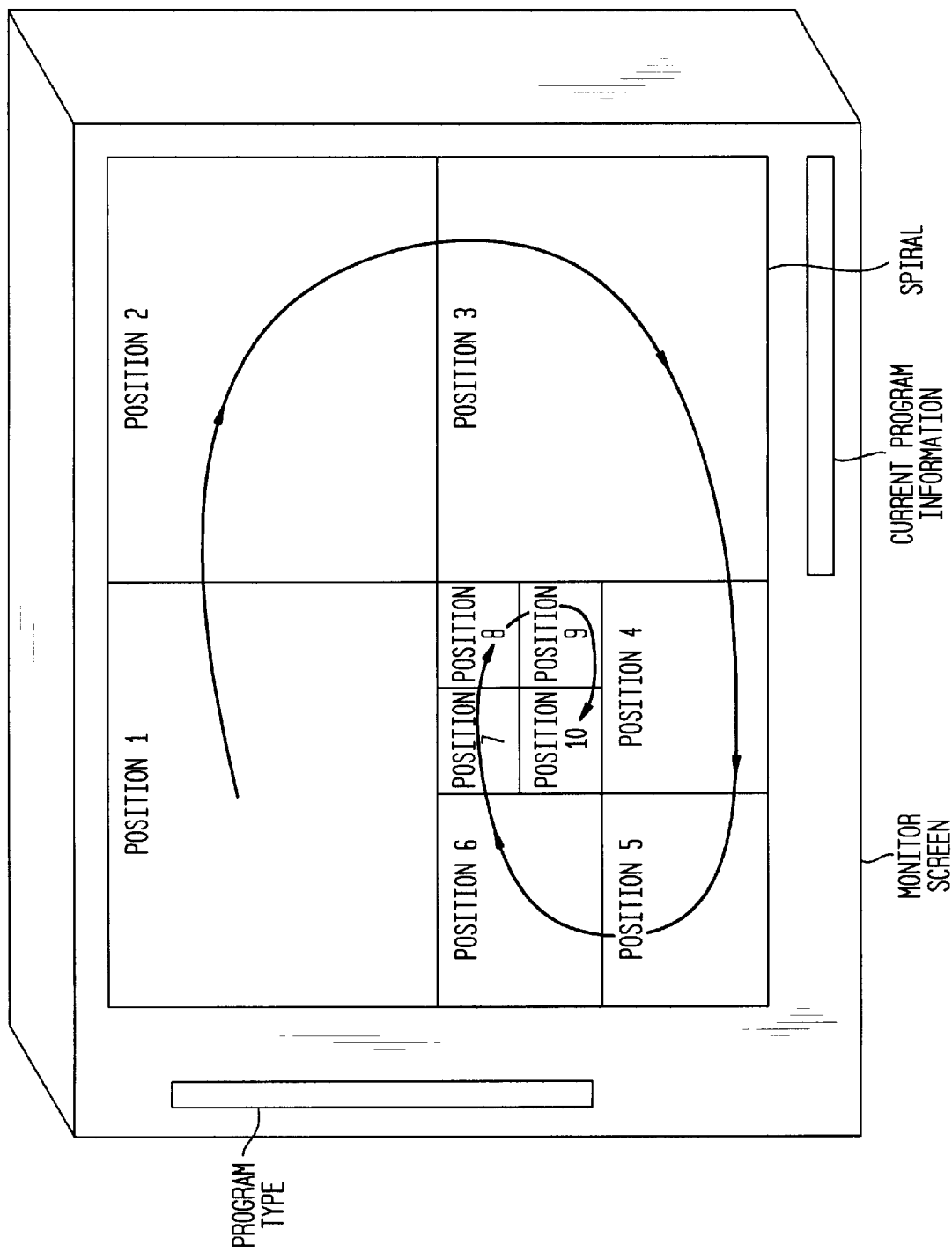
FIG. 1 illustrates a spiral formation, according to the present invention.

Referring now to FIG. 1, a spiral formation of programs most recently viewed by scanning channels of available programming is presented. The spiral is presented to the viewer on a monitor or display screen, such as a television screen. In this implementation, the program type is displayed on the left side of the screen to the left of the spiral and information about the current program, such as title, channel, time, rating, etc., is displayed on the bottom right of the screen below the spiral. It is apparent that the program type and current program information may be placed in other areas of the screen so long as visibility of the spiral is not impeded. The program type is the type of programs or channels being scanned, such as "Movies" or "Sports," for instance. The current program information is the information about the current program being viewed.

The spiral itself is made up of the most recently scanned programs, with each scanned program in the spiral being placed according to when it was displayed visa-vis the other scanned programs. In the spiral of FIG. 1, up to ten scanned programs may be displayed in positions 1 through 10. Position 1 displays the current program or most recently scanned program and, in the preferred embodiment, is a moving image of the program in real-time. Position 2 displays a still image of the program immediately scanned prior to the program of position 1. Position 3 is the still image of the program scanned prior to the program displayed in position 2 while position 4 displays a still image of the program or channel scanned prior to the program shown in position 3. Similarly, the image displayed at position 5 is older than that displayed at position 4; the image displayed at position 6 is older than that displayed at position 5; the image displayed at position 7 is older than the image displayed at position 6; the image displayed at position 8 is older than that displayed at position 7; the image displayed at position 9 is older than that displayed at position 8; the image displayed at position 10 is older than that displayed at position 9 and displays the image of the oldest channel or program displayed in this spiral.

The relative age of a scanned program is not only indicated by its position in the spiral, but its size in the spiral formation as well. It can be readily seen that the spiral is formed by the movement from the most recently scanned program (in position 1) to the oldest scanned program (in position 10). As the spiral thus moves from the newest to the oldest scanned images in a clockwise direction, as indicated by the arrows, the positions themselves gets smaller. Thus, position 10 is a larger image than is position 4 and position 4 is in turn larger than position 10, for instance.

While 10 images are displayed in the spiral of FIG. 1, it is apparent that the number of positions of the spiral is arbitrary and may be more or less as required. Of course, the more positions of the spiral, the more scan history that is provided to the viewer with the disadvantage, however, that at some point a large number of positions will be too difficult for the viewer to see. Going with less positions provides less scan history, but is more readily discernible to the viewer.

Figure 22:
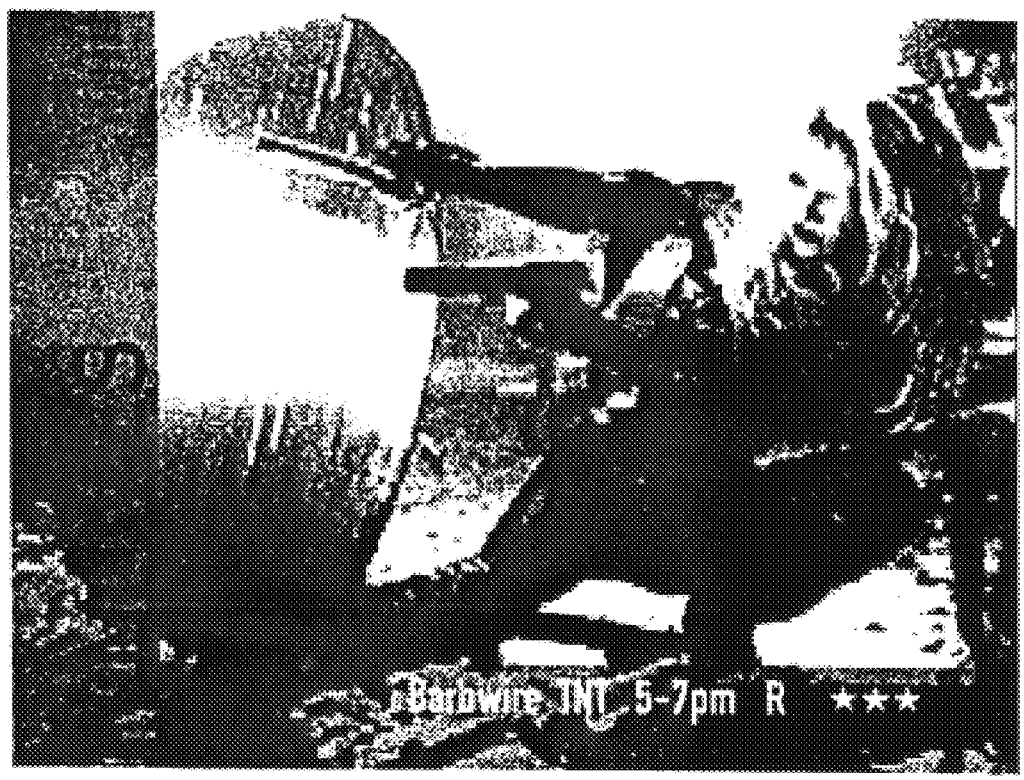
Figure 23:
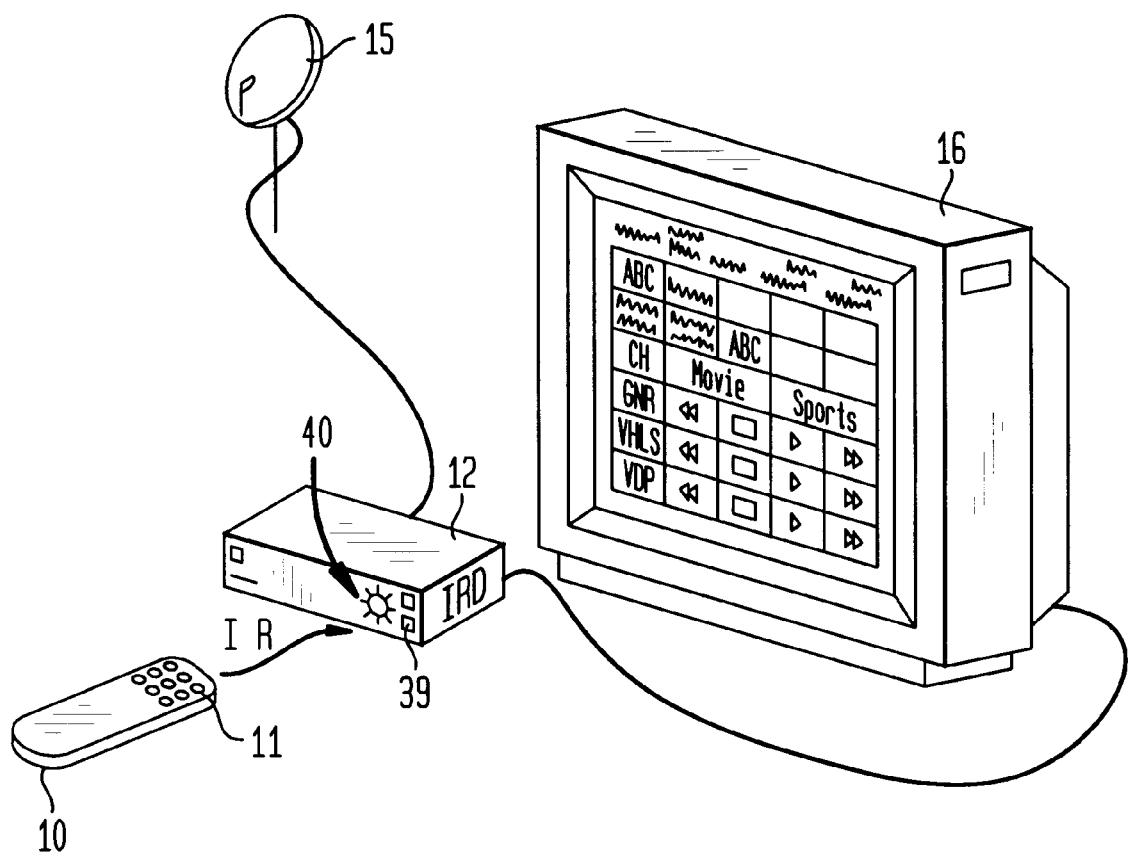
FIG. 23 illustrates a sample audio/visual (AV) system for use in conjunction with the present invention.
Figure 24:
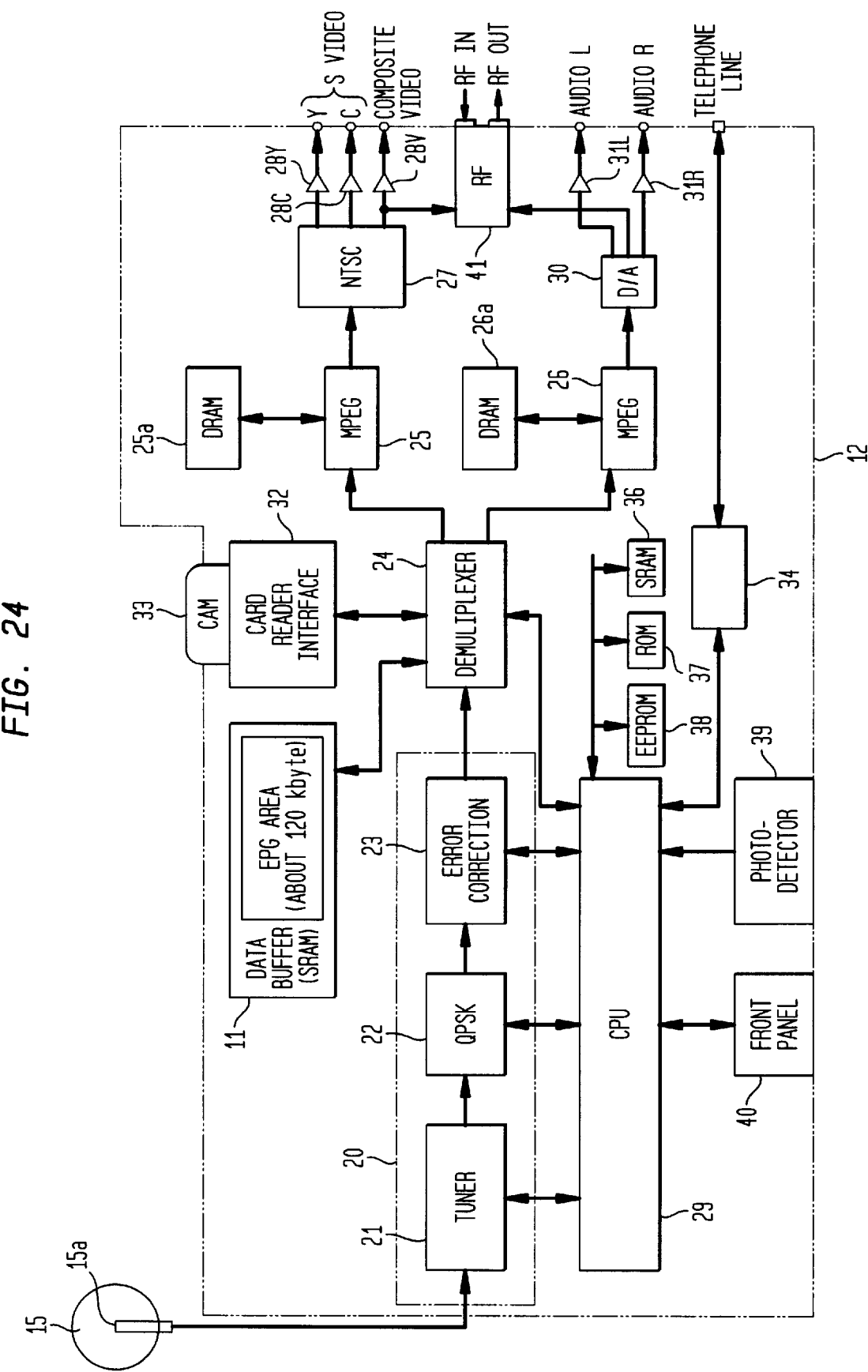
FIG. 24 illustrates a block diagram of the integrated receiver/decoder illustrated in FIG. 23.
Figure 25:
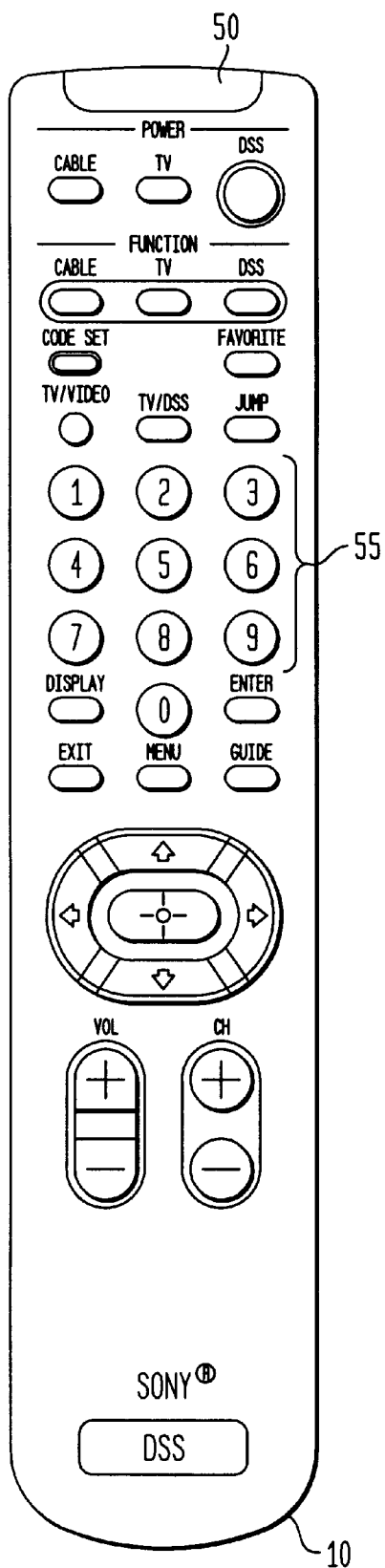
FIG. 25 illustrates a representative remote controller shown in FIG. 23.
Figure 26:
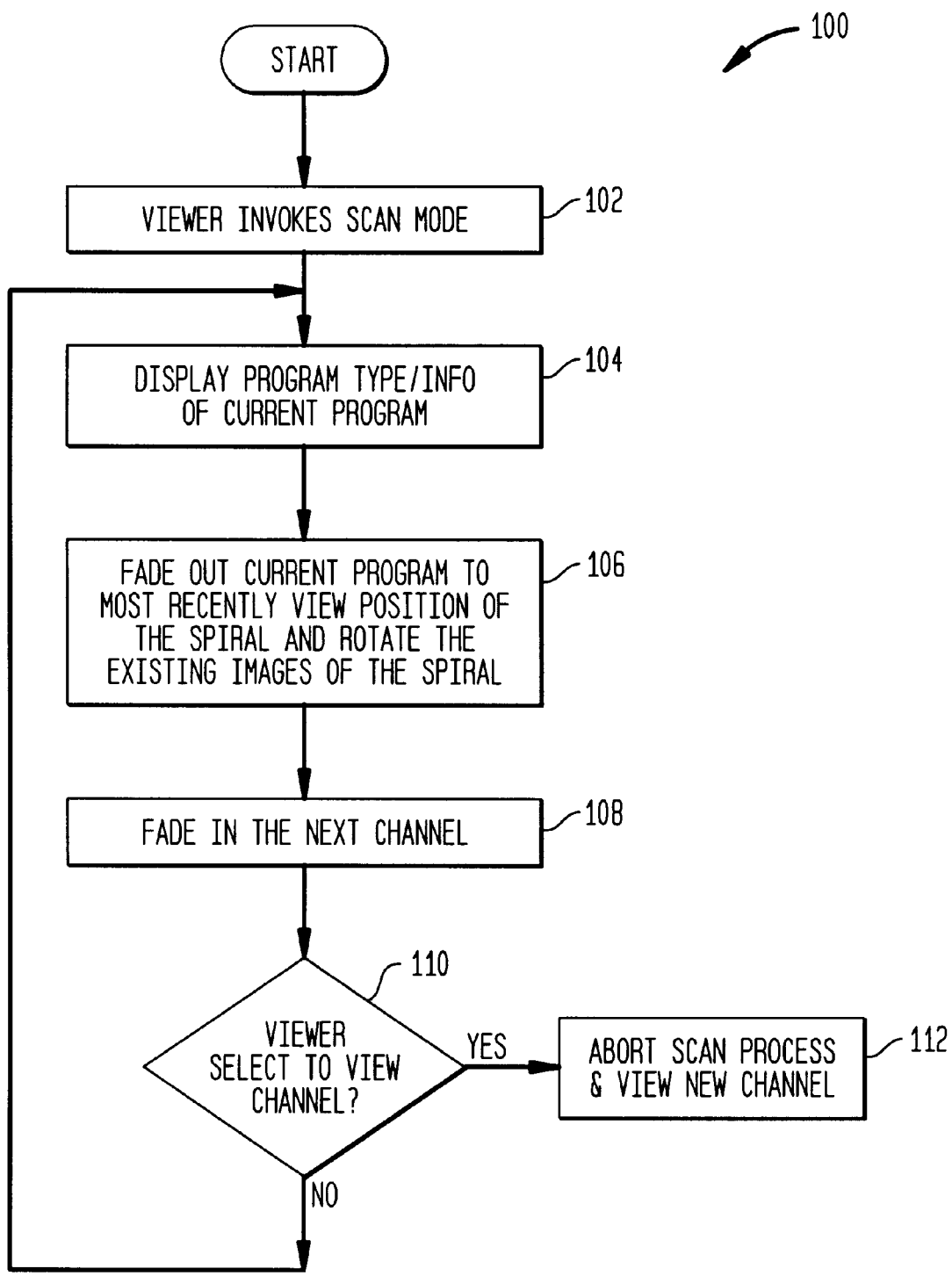
FIG. 26 is a flow chart that illustrates the methodology of the present invention.

Reference to FIGS. 2 through 22 illustrates the spiral formation and its use by a viewer. These figures illustrate sequentially the novel scanning and visual presentation method of the present invention in a typical television viewing scenario. FIGS. 23–25 illustrate a typical system implementation of the present invention in a television satellite application. FIG. 26 illustrates the methodology of the present invention.

Figure 2:
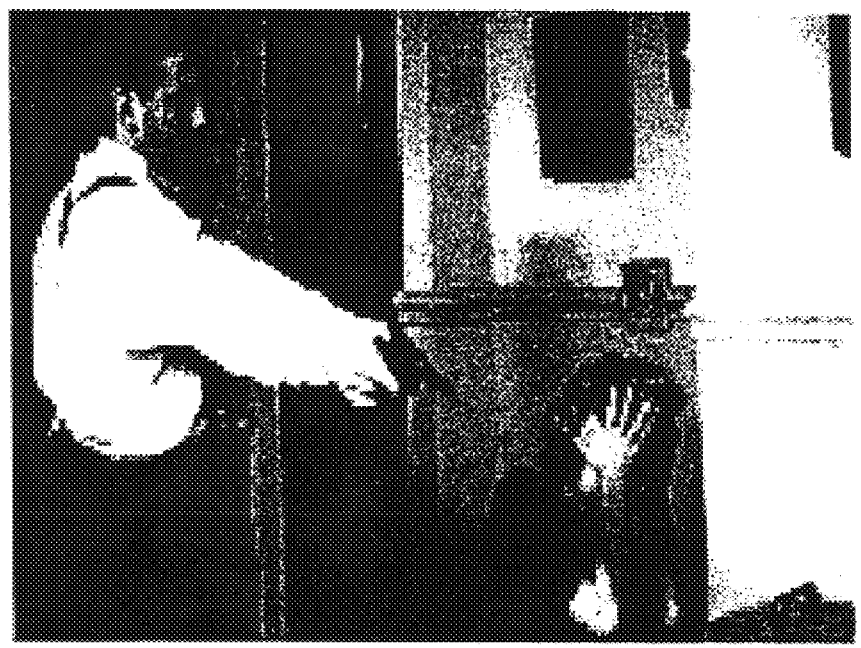
FIGS. 2 to 22 illustrate the formation and use of the spiral mechanism of present invention.
Figure 3:
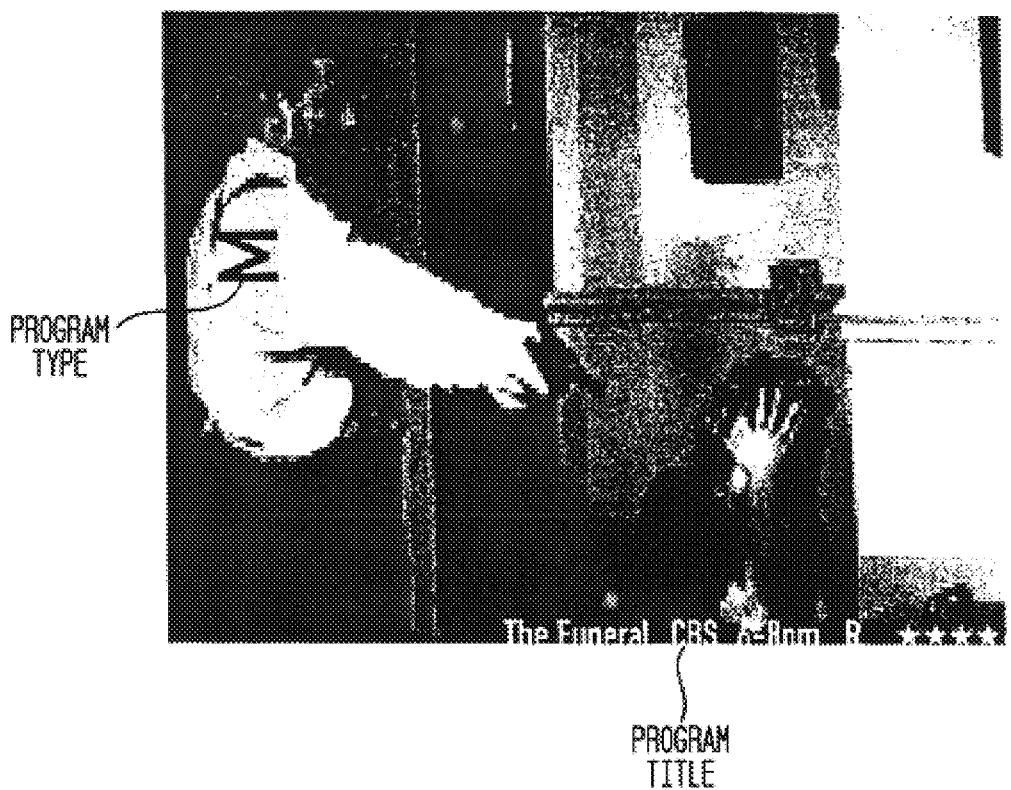
Figure 4:

Referring first to FIG. 2, the television screen is displaying full motion video and the scanning function has not yet been invoked by the viewer. At this time the viewer invokes the scanning function of the television so as to automatically scan other available channels. As the user activates the scan function, such as by pressing the appropriate button on the remote control device, the information about the current program and the program type start to slide into the screen, as shown in FIG. 3. In this example, the program type is "Movie" and information about the film is "The Funeral CBS 6–8 pm R ****." In FIG. 4, the program information and program type are fully displayed. The screen retains this image for a short interval of time, such as for 2–3 seconds.

Figure 5:
Figure 6:
Figure 7:
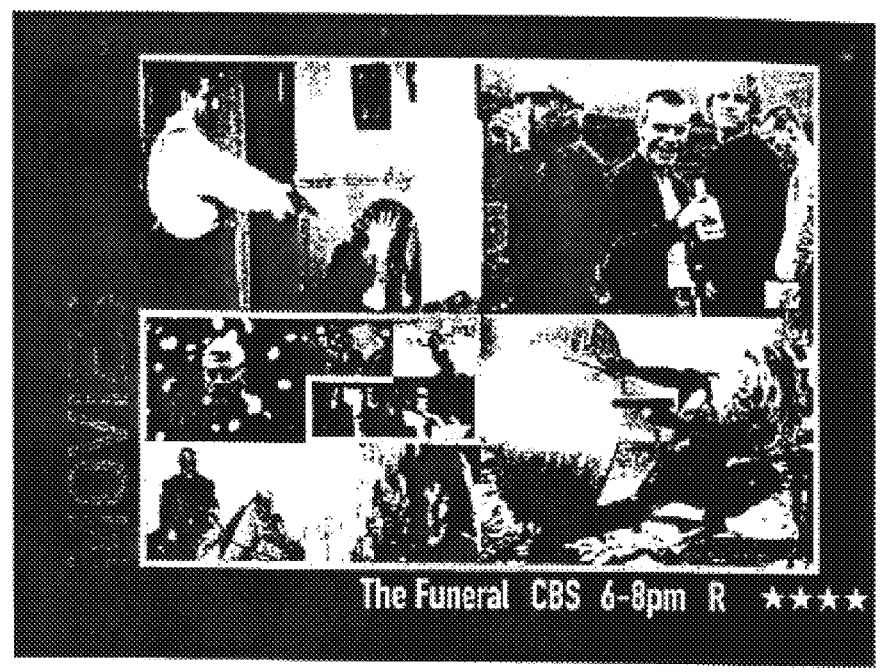

Before the scan function proceeds to the next program to be scanned, the video of the current program begins to zoom back into the spiral to the most recent position of the spiral (position 1) as shown in FIG. 5. As the current program zooms back into the spiral, the images already in the spiral rotate clockwise so as to make the most recent position of the spiral available to display the current program as shown in FIG. 6. This clockwise rotation of the images causes the image that was displayed in the oldest position (position 10, in this example) to rotate out of the spiral so that it is no longer displayed. The spiral is read in a clockwise manner, stating with the current channel, as explained previously. FIG. 7 shows the spiral after the zoom back of the current program and the rotation of the spiral has occurred. It can be seen that the spiral displays other recently watched channels from recent to old in a clockwise fashion, starting at position 1.

Figure 8:
Figure 9:

After the current channel has thus been placed in the spiral, the scanning process continues. As shown in FIG. 8, as a new channel is being scanned, the next "current channel," a transition screen fading out the spiral and fading in the next program channel is shown. The transition is accomplished as a fade-in in which both the spiral and the next channel can be seen simultaneously for a brief period of time. FIG. 9 displays the new channel that has become the current channel after the spiral has faded out. The screen displays a full screen image of the new (current) channel for a short interval (a few seconds) to allow the viewer to abort the scanning process in favor of continuous viewing of the channel if so desired.

Figure 10:
Figure 11:

If the viewer has not decided to view the program displayed in FIG. 9, the scanning process continues and the new channel of FIG. 9 becomes the current channel. The program type, "Movies," and current program information, "Goodfellas TMC 6–8 pm R**" are displayed for the current channel and the current channel begins to zoom back into the most recent position of the spiral, as shown in FIG. 10. In FIG. 11, the zoom back and rotation of the spiral are now complete. Note that "Goodfellas" is the new program in position 1, "The Funeral" has rotated clockwise to position 2, the most recently scanned program after position 1, and the program that was displayed in position 10** has rotated out of the spiral.

Figure 12:
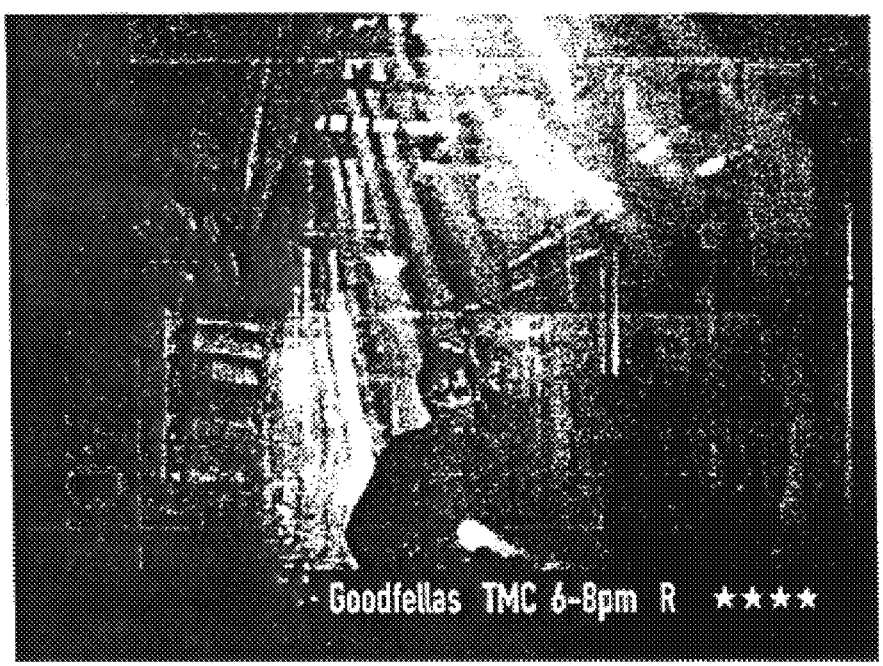
Figure 13:
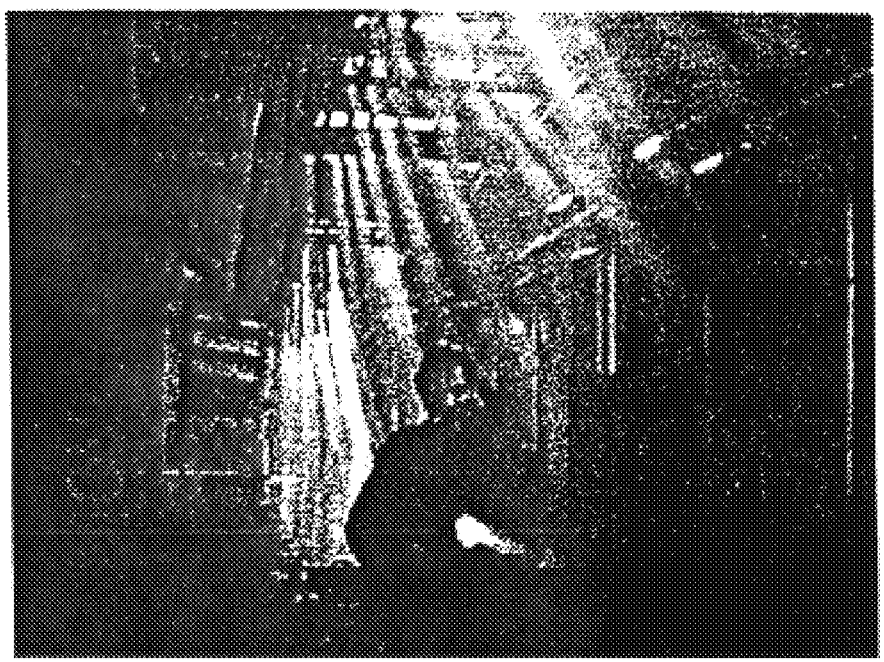
Figure 14:
Figure 15:
Figure 16:

The scanning process continues. A third channel is now being scanned and it fades into full motion video to replace the spiral of FIG. 11 as shown in FIG. 12. The fade-in of the new channel continues in FIG. 13 and in FIG. 14, after the new program "Deep Rising" has not been selected to be viewed, the scanning process continues when the current program starts to recede and fade into the spiral. The views of the spiral rotate clockwise to accommodate the current channel in the spiral. In FIG. 15 the spiral is illustrated after the zoom out of "Deep Rising" and the clockwise rotation has occurred. The "Deep Rising" program of the current channel is now displayed as full motion video in position 10 of the completed spiral and the view of the channel that was in position 9 of FIG. 11 has not been rotated to FIG. 10 as shown.

Figure 17:
Figure 18:
Figure 19:

As previously mentioned, the viewer can select to view a channel's program at any time by appropriate manipulation of the remote control device. This is demonstrated in FIG. 16. The viewer has activated a four-way cursor button of the remote control device, causing the automatic scanning feature to pause and the current channel of position 1 to be selected. The selection of the current program is illustrated by the box that highlights the program in position 1. The viewer can select any program viewed in the spiral in this manner. In FIG. 17, the viewer is manipulating the remote control device to move the cursor from position 1 to position 6. As the cursor moves, it scales to fit the size of the position where the cursor is located. In FIG. 18, the viewer has selected the program of position 6 and the highlight box highlights position 6 as shown. The video of the channel in position 6 is displayed and the title for that channel is also displayed.

Figure 20:
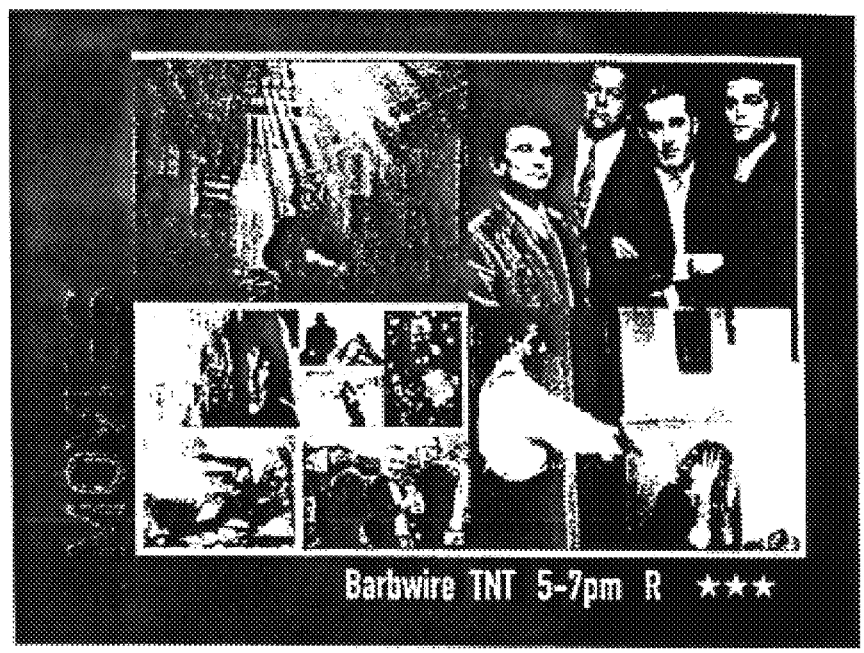
Figure 21:
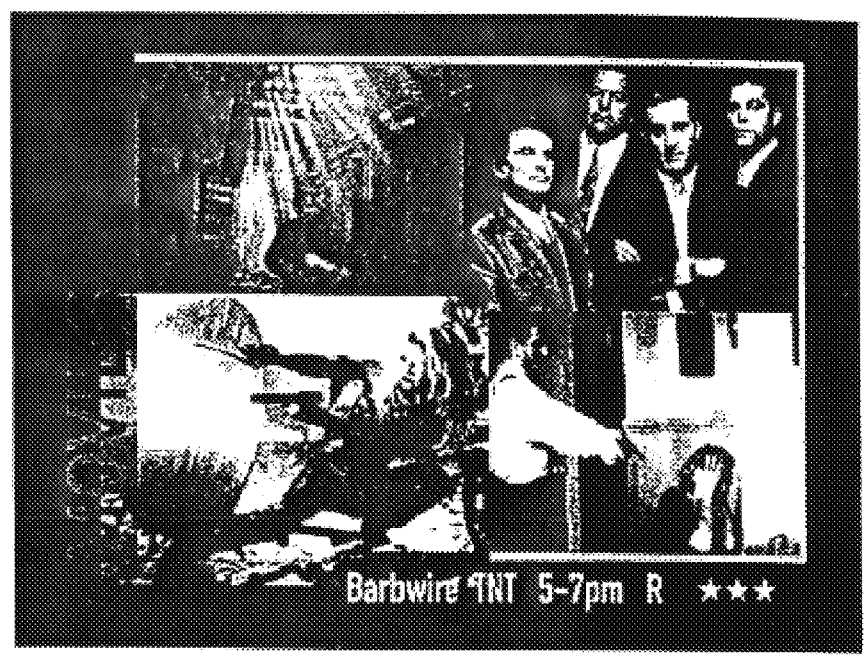

In FIG. 19 the viewer has again activated the four-way cursor button of the remote control, causing the cursor to move towards position 5 and the title of the program of position 6 to fade out. FIG. 20 shows that the viewer has selected the program of the channel in position 5, causing the program information for that program to be displayed: "Barbwire TNT 5–7 pm R**". In FIG. 21, the viewer has selected to view "Barbwire" by hitting the "SELECT" or "ZOOM IN" button of the remote control device. The channel in position 5 starts to zoom forward as shown. In FIG. 22, the selected channel has now zoomed to full screen video. The program type "Movie" and program information "Barbwire TNT 5–7 pm R**" are displayed as shown for a short interval until they fade out. The viewer continues to watch this channel and the automatic scanning feature has now ended.

As can be seen from the above discussion, a historical chronological perspective is maintained by the novel spiral method of visual presentation. The user can stop scanning at any time, and then resume scanning at will. It is not necessary for the user to remember past channel numbers, as they are automatically recalled electronically upon viewer selection of a past channel. The variable sizing of the images, their connection in the geometric spiral, and constant clockwise progression mean that the visual presentation is intuitive and user friendly.

The present invention uses visual factors, such as geometric pattern, scaling and orientation in order to visually express the relative chronological relative position of sequentially scanned information with regard to intuitive and user friendly visual presentation. To that end, the present invention has application in any environment or application in which an improved visual presentation of scanned information content is useful. For instance, the present invention could be used to display the results of channel surfing (equivalent to scanning) on the internet, or scanning a multitude of files or documents on a computer system. In all cases the present invention provides the user an intuitive friendly method for viewing past scan results without the need to remember their location, either name or chronological distance back.

As previously-mentioned, the present invention may be implemented by an audio/visual (AV) system having a remote control for scanning and subsequent selection of programming. FIG. 23 illustrates a representative audio/visual (AV) system capable of implementing the present invention. The,AV system of FIG. 23 is a simplified diagram of a Direct Satellite System (DSS). The system has a remote controller 10 with data buffer 11, an integrated receiver/decoder 12 (IRD), commonly referred to as a "set-top box," an antenna 15, and a monitor 16. Packets of data are transmitted by a transponder of the satellite, with each transponder transmitting data in a time share manner at a predetermined frequency. A tuner of the IRD, shown as 21 of FIG. 24, is tuned to the frequency of the transponder corresponding to a channel designated by a viewer of the system and packets of digital data of that channel are received by the IRD 12.

Antenna 15 receives an encoded data signal sent from a satellite and the encoded data signal is decoded by IRD 12.

Low noise block down converter 15a (LND) of antenna 15 converts a frequency of a signal sent from the satellite to another frequency. The converted signal is supplied to IRD 12 which in turn supplies a signal to monitor 16.

FIG. 24 illustrates a block diagram of IRD 12. A radio frequency (IR) signal output from LNB 15a of antenna 15 is supplied to a tuner 21 of a front-end block 20. The output from tuner 21 is supplied to a quadrature phase shift keying (QPSK) demodulation circuit 22 for demodulation. The output from QPSK demodulation circuit 22 is supplied to an error correcting circuit 23 for error correction. The data is received in encrypted and encoded, i.e. compressed, form.

Demultiplexer transport IC 24 stores the data stream, consisting of packets of data, received from error correcting circuit 23 of block 20 and directs portions of the data stream to the appropriate circuit for processing. The-digital data stream sent from a satellite includes headers for classifying the different portions of the data in the digital data stream. The transport IC 24 stores the headers in registers and uses the headers to direct data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Data that is identified to be EPG data is transferred to an area of data buffer 11 of the remote controller 10 that stores the EPG data.

Conditional access module (CAM), which typically includes a central processing unit (CPU), a read-only memory (ROM), and a random access memory (RAM), determines whether the user has the authorization to receive certain data, such as access to a pay TV station, using the authorization information stored in its memory. If the CAM determines that the user has the proper authorization for access, a key to decrypt the incoming data is provided to transport IC 24 which decrypts the data using the provided key. A smart card containing the key may be utilized, in which case the smart card is inserted into card reader interface 32.

The MPEG video and audio decoders, 25 and 26, respectively, each have a dynamic random access memory (DRAM) 25a and 26a that is used for buffering and storing data during processing by the associated decoder. The decoded digital video signal is supplied to a National Television System Committee (NTSC) encoder 27 and converted to a luminance signal (Y) and a chroma signal (C) output by buffer amplifiers 28Y and 28C, respectively, as an S video signal. A composite video signal is output through buffer amplifier 28V as shown. The decoded digital audio signal is converted into an analog audio signal by D/A converter (DAC) 30 which outputs the left audio signal through buffer amplifier 31L and the right audio signal through buffer amplifier 31R. RF modulator 41 mixes the composite video signal with an analog audio signal and converts the mixed signal into an RF output signal.

CPU 29 is the central control mechanism of IRD 12. It executes instructions stored preferably in ROM 37 in order to perform certain system functions. For example, CPU 29 receives and processes user inputs received from front panel buttons or switches 40 of IRD 12 and the photodetector circuit 39 to provide requested user functionality and access. CPU 29 also accesses user settings and preferences, stored in non-volatile memory (NVM) such as electrically erasable programmable read-only memory (EEPROM) 38, for processing of information and configuration of the system.

FIG. 25 shows a representative remote controller 10. Remote controller 10 is utilized by a user to transmit commands and make program selections in accordance with the teachings of the present invention. Remote controller 10 has an infrared (IR) originating device 50, a set of operation buttons that are controlled by the user 55, a CPU, a ROM, and a RAM, not shown here. Operation buttons 55 include a direction key for pointing the cursor in a horizontal or a vertical direction, a "SELECT" key, a "MENU" key, a "FAVORITE" key, an "EXIT" key, a ten-key alphanumeric pad, an "ENTER" key, and other function keys known in the art. The CPU of remote controller 10 receives a signal when a user presses an operation button 55 and processes the signal in accordance with a program stored in ROM. The RAM is controlled by the CPU to produce a transmitting code that is sent to IR originating device 50 where it is converted to an IR signal. The IR signal is then transmitted to IRD 12.

Referring now to FIG. 26, a flowchart 100 illustrates the methodology of the present invention. At Block 102, the viewer invokes the scan mode through manipulation of the remote control device as described above. The scan process begins by displaying the program type and information of the current program at Block 104, before-fading out the current program to the most recently viewed position of the spiral and simultaneously rotating the views of the spiral clockwise to make room for the current program at Block 106. Once the current program has been zoomed out to the spiral, the spiral is-complete and the.next channel is faded in to become the new, current program at Block 108. If the viewer chooses to view the current program, the scanning operation is aborted and the selected current program is viewed at Block 112. If the viewer does not choose to view the current program, the scanning operation continues as shown.

While the invention has been particularly shown and described with reference to a preferred embodiment, it will be understood by those skilled in the art that various changes in form and detail may be made therein without departing from the spirit and scope of the invention.

What is claimed is:

1. A method for displaying available programming on a display screen of a video system that provides visual information to a viewer of the video system, the method comprising:

determining channels that the viewer selects for viewing to provide a sequence including
a first channel, a second channel, and a third channel, wherein relative to each other the first channel is the least recently viewed channel and the third channel is the most recently viewed channel;
receiving a signal that invokes a display mode in which depictions of programming content on previously viewed channels are simultaneously presented on the display screen; and
responsive to receipt of the signal that invokes the display mode, simultaneously displaying on the display screen depictions of programming content on a plurality of previously viewed channels including the first, second and third channels, wherein the plurality of previously viewed channels are displayed in a spiral formation, a first location of the spiral formation corresponding to the most recently viewed channel, with more recently viewed channels among the plurality of previously viewed channels appearing closer to the viewer and occupying more display screen surface area relative to less recently viewed channels, such that the depiction of the third channel occupies more display screen surface area than the depiction of the second channel, and the depiction of the second channel occupies more display screen surface area than the depiction of the first channel.

2. The method of claim 1, wherein the depiction of the programming content on the most recently viewed channel includes the current video and audio signals corresponding to the most recently viewed channel.

3. The method of claim 1, wherein a first end of the spiral formation is the first location, and further comprising:
receiving a signal that selects a fourth channel;
updating the display screen in the display mode to depict the fourth channel at the first end of the spiral formation, and rotating the depictions of the first, second, and third channels along the spiral towards a second end of the spiral formation.

4. The method of claim 3, wherein the depiction of the fourth channel comprises current audio and video signals for the fourth channel, and the depictions of the first, second and third channels comprise still images.

5. The method of claim 4, wherein in the display mode additional programming information corresponding to the programming content available on the fourth channel is simultaneously displayed in proximity with the depiction of fourth channel.

6. A storage media containing a computer program for displaying available programming on a display screen of a video system that provides visual information to a viewer of the video system, the computer program including instructions for:
determining channels that the viewer selects for viewing to provide a sequence including a first channel, a second channel, and a third channel, wherein relative to each other the first channel is the least recently viewed channel and the third channel is the most recently viewed channel;
receiving a signal that invokes a display mode in which depictions of programming content on previously viewed channels are simultaneously presented on the display screen; and
responding to receipt of the signal that invokes the display mode by simultaneously displaying on the display screen depictions of programming content on a plurality of previously viewed channels including the first, second and third channels, wherein the plurality of previously viewed channels are displayed in a spiral formation, a first location of the spiral formation corresponding to the most recently viewed channel, with more recently viewed channels among the plurality of previously viewed channels appearing closer to the viewer and occupying more display screen surface area relative topless recently viewed channels, such that the depiction of the third channel occupies more display screen surface area than the depiction of the second channel, and the depiction of the second channel occupies more display screen surface area than the depiction of the first channel.

7. The storage media containing a computer program of claim 6, wherein the depiction of the programming content on the most recently viewed channel includes the current video and audio signals corresponding to the most recently viewed channel.

8. The storage media containing a computer program of claim 6, wherein a first end of the spiral formation is the first location, and the computer program further comprises instructions for:
receiving a signal that selects a fourth channel; and
updating the display screen in the display mode to depict the fourth channel at the first end of the spiral formation, and rotating the depictions of the first, second, and third channels along the spiral towards a second end of the spiral formation.

9. The storage media containing a computer program of claim 8, wherein the depiction of the fourth channel comprises current audio and video signals for the fourth channel, and the depictions of the first, second and third channels comprise still images.

10. The storage media containing a computer program of claim 9, wherein in the display mode additional programming information corresponding to the programming content available on the fourth channel is simultaneously displayed in proximity with the depiction of fourth channel.

11. An apparatus for displaying available programming on a display screen of a video system that provides visual information to a viewer of the video system, the apparatus comprising:
means for determining channels that the viewer selects for viewing to provide a sequence including a first channel, a second channel, and a third channel, wherein relative to each other the first channel is the least recently viewed channel and the third channel is the most recently viewed channel;
means for receiving a signal that invokes a display mode in which depictions of programming content on previously viewed channels are simultaneously presented on the display screen; and
means for responding to receipt of the signal that invokes the display mode by simultaneously displaying on the display screen depictions of programming content on a plurality of previously viewed channels including the first, second and third channels, wherein the plurality of previously viewed channels are displayed in a spiral formation, a first location of the spiral formation corresponding to the most recently viewed channel, with more recently viewed channels among the plurality of previously viewed channels appearing closer to the viewer and occupying more display screen surface area relative to less recently viewed channels, such that the depiction of the third chanrel occupies more display screen surface area than the depiction of the second channel, and the depiction of the second channel occupies more display screen surface area than the depiction of the first channel.

12. The apparatus of claim 11, wherein the depiction of the programming content on the most recently viewed channel includes the current video and audio signals corresponding to the most recently viewed channel.

13. The apparatus of claim 11, wherein a first end of the spiral formation is the first location, further comprising:
means for receiving a signal that selects a fourth channel; and
means for updating the display screen in the display mode to depict the fourth channel at the first end of the spiral formation, and rotating the depictions of the first, second, and third channels along the spiral towards a second end of the spiral formation.

14. The apparatus of claim 13, wherein the depiction of the fourth channel comprises current audio and video signals for the fourth channel, and the depictions of the first, second and third channels comprise still images.

15. The apparatus of claim 14, wherein in the display mode additional programming information corresponding to the programming content available on the fourth channel is simultaneously displayed in proximity with the depiction of fourth channel.

\* \* \* \* \*